US005778363A

United States Patent [19]
Light

[11] Patent Number: 5,778,363
[45] Date of Patent: Jul. 7, 1998

[54] METHOD FOR MEASURING THRESHOLDED RELEVANCE OF A DOCUMENT TO A SPECIFIED TOPIC

[75] Inventor: John Light, Hillsboro, Oreg.

[73] Assignee: Intel Corporation, Santa Clara, Calif.

[21] Appl. No.: 774,467

[22] Filed: Dec. 30, 1996

[51] Int. Cl.$^6$ .................................................. G06F 17/30
[52] U.S. Cl. ...................................... 707/5; 707/1; 707/3
[58] Field of Search ................................... 707/1, 3, 6, 5, 707/513

[56] References Cited

U.S. PATENT DOCUMENTS

| 5,418,951 | 5/1995 | Damashek | 707/5 |
| 5,442,778 | 8/1995 | Pedersen et al. | 707/5 |

OTHER PUBLICATIONS

K.L. Kwok, "Experiments with a Component Theory of Probalistic Information Retrieval Based on Single Terms as Document Components" ACM Transactions on Information Systems. vol. 8 No. 4. Oct. 1990. pp. 363–386.

Udi Manber & Sun Wu, "Glimpse: A Tool to Search Through Entire File Systems," Oct., 1993, pp. 1–10.

Salton, "Automatic Text Processing," Ch. 8–10, 1989, Addison–Wesley, pp. 228–371.

Salton/Mc Gill, "Introduction To Modern Information Retrieval," Ch. 3–6, 1983 McGraw–Hill, pp. 53–256.

*Primary Examiner*—Paul V. Kulik
*Attorney, Agent, or Firm*—Leo V. Novakoski

[57] ABSTRACT

A method is provided for specifying the representation of a document and determining the relevance of the document according to an externally defined topic profile. The topic profile includes one or more compound terms having a positive correlation with the topic of interest. Each compound term has a specified form such as capitalization, punctuation, number, or adjacency relation, that is either ignored by conventional indexing processes or requires substantial data overhead to track. The compound terms of the topic profile are tagged to indicate how corresponding terms are treated when identified in a document being analyzed. Application of the topic profile to a document generates a document representation in which compound terms present in the document are retained in their specified form. A similarity function between the document representation and the topic profile is calculated, and the result is compared to a relevance threshold associated with the topic profile. A document is deemed relevant to the topic when the similarity function meets or exceeds the threshold.

30 Claims, 7 Drawing Sheets

METHOD FOR MEASURING THRESHOLDED RELEVANCE OF A DOCUMENT TO A SPECIFIED TOPIC

RELATED PATENT APPLICATIONS

This patent application is related to U.S. patent application Ser. No. 08/773,194, entitled, Method For Recognizing Compound Terms In A Document, assigned to the same assignee herein, and filed on even date herewith. This patent application is also related to U.S. patent application Ser. No. 08/778,212, entitled Method For Characterizing A Document Set Using Evaluation Surrogates, assigned to the same assignee herein, and filed on even date herewith.

BACKGROUND OF THE INVENTION

1. Technical Field

This invention is related to the field of information retrieval and in particular to methods for analyzing a document to assign a measure of the relevance of the document to a specified topic.

2. Background Art

Modern computer technology allows databases to incorporate ever greater amounts of information. In order to take full advantage of these advances, methods must be developed to identify and retrieve information in a database that is relevant to a specified subject. Effective information retrieval (IR) requires that the information be represented in a manner that facilitates searching. It also requires means for specifying the search terms used to identify documents that include the information being sought.

In the conventional IR paradigm for text based documents, the focal point of searching/browsing is a relatively static, information-rich representation of the document set that is suitable for searches on a wide range of subjects. In this paradigm, text based documents are represented by an index file that is derived from the terms of the documents through tokenization, stopping, stemming, and inversion steps. The resulting file is structured so that each term derived from the document set serves as an index to the documents in which it appears. Keyword-based queries are generated as needed to probe this representation for documents that include specified keywords. Indexing methods are computationally intensive, requiring powerful computers systems that have substantial processing and storage capacities. These methods are discussed, for example, in Salton, *Automatic Text Processing*, Addison-Wesley, Reading, Mass. (1989) and in Salton & McGill, *Introduction to Modern Information Retrieval*, McGraw-Hill, New York (1983).

The keyword-based queries used to probe index files comprise search terms that are selected on the basis of their correlation with the subject of interest. These are compared with the index to identify those documents of the set that include the specified keywords. This comparison is inexact, however, since conventional indexing methods eliminate punctuation, number (plurals), capitalization, and other index term data that might be useful in characterizing the contents of the document set. The elimination of potentially valuable search information from index terms is justified by the need to put index terms in a form that is sufficiently generic to support searches on a wide variety of subjects. It also limits the storage overhead associated with retaining detailed information in the index file.

In order to tailor query terms (keywords) to a selected topic, most keyword-based search methods allow Boolean and adjacency restrictions to be specified between terms. Some IR systems identify those documents that include all query keywords or their equivalents. Other systems, calculate a similarity function between the keywords of a query and the index terms present in each document. The similarity function measures the statistical correlation between the terms (keywords) of the query and those of the document. These term-correlation methods may deem a document relevant, even if it does not contain all keywords of the query, provided the calculated function exceeds a threshold value. Certain term-matching and term-correlation methods also allow a weight to be specified for each keyword to indicate the relative significance of the key word to the subject of the query.

The effectiveness of keyword-based search methods is limited by the user's ability to capture a subject area using combinations of keywords as well as by the absence from the index terms of specifics, such as capitalizations (proper nouns), number (plural/singular), punctuation, and the like. Since keyword searches are relatively easy to generate, search queries may undergo multiple modifications before documents relevant to the subject area of interest are reliably identified. Queries are thus ephemeral entities that are created anew for each search and discarded as soon as they are used. Users have little incentive to refine and develop queries for specific topics. In addition, keyword-based queries are generated independently of indexing files. Thus, there is no means to build in any correlation between the document terms retained in an index file and the keywords employed in a query of the file.

Hypertext documents sets, such as those on the World Wide Web, may be searched using conventional index-based schemes, in which case relevance may be determined using the methods described above. Typically, however, hypertext documents are searched by following the inter-document links built into the document set. There are still relatively few hypertext document sets currently available and those that exist are effectively hard-wired together according the developer's evaluation of their relevance to each other. Hyper-linked document sets are not typically exhaustive as to any one topic nor are they readily expandable.

SUMMARY OF THE INVENTION

The present invention determines the relevance of a document to a topic by reference to an externally defined topic profile. The topic profile comprises terms having a positive correlation with the topic of interest (profile terms), and at least one profile term is specified by a compound term template, which identifies any instance of the profile term appearing in the document in the specified form.

In accordance with the present invention, a document is converted into a stream of tokens and compared with the compound term data structure specified in the topic profile. The stream of document tokens is augmented by a compound term token when document tokens matching the template are identified, and the augmented stream provides a representation of the document. A similarity function is calculated between the document representation and the topic profile to provide a thresholded measure of relevance of the document to the topic represented by the topic profile.

BRIEF DESCRIPTION OF THE DRAWINGS

The invention may best be understood with reference to the following detailed description and the accompanying drawings.

DETAILED DESCRIPTION OF THE INVENTION

The present invention enables a new paradigm for searching in which the searching tool is an externally defined topic profile that is used to both generate a representation of a document and analyze the document representation for relevance to the topic profile, i.e. the topic. This is in sharp contrast to the relatively static index used to represent document sets in conventional IR systems and the ephemeral, independently generated keyword-based queries used to probe the index.

In accordance with the present invention, a topic is represented by an externally-defined topic profile comprising one or more profile terms that are characteristic of the topic. At least one of the profile terms is defined by a compound term template that specifies the capitalization, number, punctuation, or adjacency properties of a compound term to be identified in a document. The topic profile is applied to a tokenized form of the document to identify instances of the compound term(s) that match the detailed form specified by the template and to preserve these instances in a representation of the document. In particular, these terms are identified prior to stopping and stemming, which eliminate detailed information such as capitalization, number, punctuation, or adjacency, from document terms. Consequently, the topic profile can incorporate profile terms that describe the associated topic with greater precision.

Following generation of the document representation, the topic profile is invoked to determine a measure of the relevance of the document to the topic represented by the profile. This measure (topic value) depends on the value of a similarity function, which indicates the statistical correlation between the terms of the topic profile and the document representation.

In one embodiment of the invention, tags associated with profile terms identified in a document may be used to modify the evaluation of the similarity function. For example, the tags may be used to adjust weights associated with profile terms or to by-pass a threshold calculation altogether.

The relevance threshold specifies a minimum value of the similarity function required to characterize a document as relevant to the topic profile and operates as a binary filter for selecting relevant documents. In one embodiment of the invention, a document is deemed relevant when the topic value exceeds the specified threshold. Where the topic value fails to meet the specified threshold, the document is deemed not relevant. Since the profile terms, weights, and tags are specified in the topic profile, the topic value represents a thresholded measure of relevance that is based on an externally defined standard, i.e. the topic profile.

As noted above, a profile term may be assigned a weight to indicate its relative significance to the topic. In another embodiment of the invention, first and second weights may be assigned to a profile term. The first weight is used for calculating a similarity function for comparison with the specified threshold, and the second weight is used for calculating the topic value. In this embodiment, the multiple weights allow the profile terms to be weighted differently once a document is deemed to meet the relevance threshold. In effect, this scheme adjusts the significance assigned to the presence of profile terms in the document once it is determined that the document meets the relevance threshold. It also provides greater flexibility in the way profile terms, especially those that alias unrelated topics, are used in the analysis.

In still another embodiment of the invention, selected profile terms may be tagged to indicate modifications of the relevance determination. For example, where a profile term is deemed essential to a discussion of the associated topic, the profile term may be tagged to indicate that its presence is required in the document to deem the document relevant to the topic. Such a tag overrides determinations of relevance based on similarity function for the document when the tagged profile term is present in the document. The presence of such tagged terms in a document may be interpreted as a necessary but not sufficient condition for a document to be deemed relevant.

Other terms may have such a high correlation with the topic, that their presence in a document guarantees the document is relevant to the topic. These terms may be tagged with a different marker to indicate that any document containing the term is deemed relevant, independent of the value calculated by the similarity function. The use of tagging and multiple weights in topic profiles are discussed in greater detail below.

Figure 1:
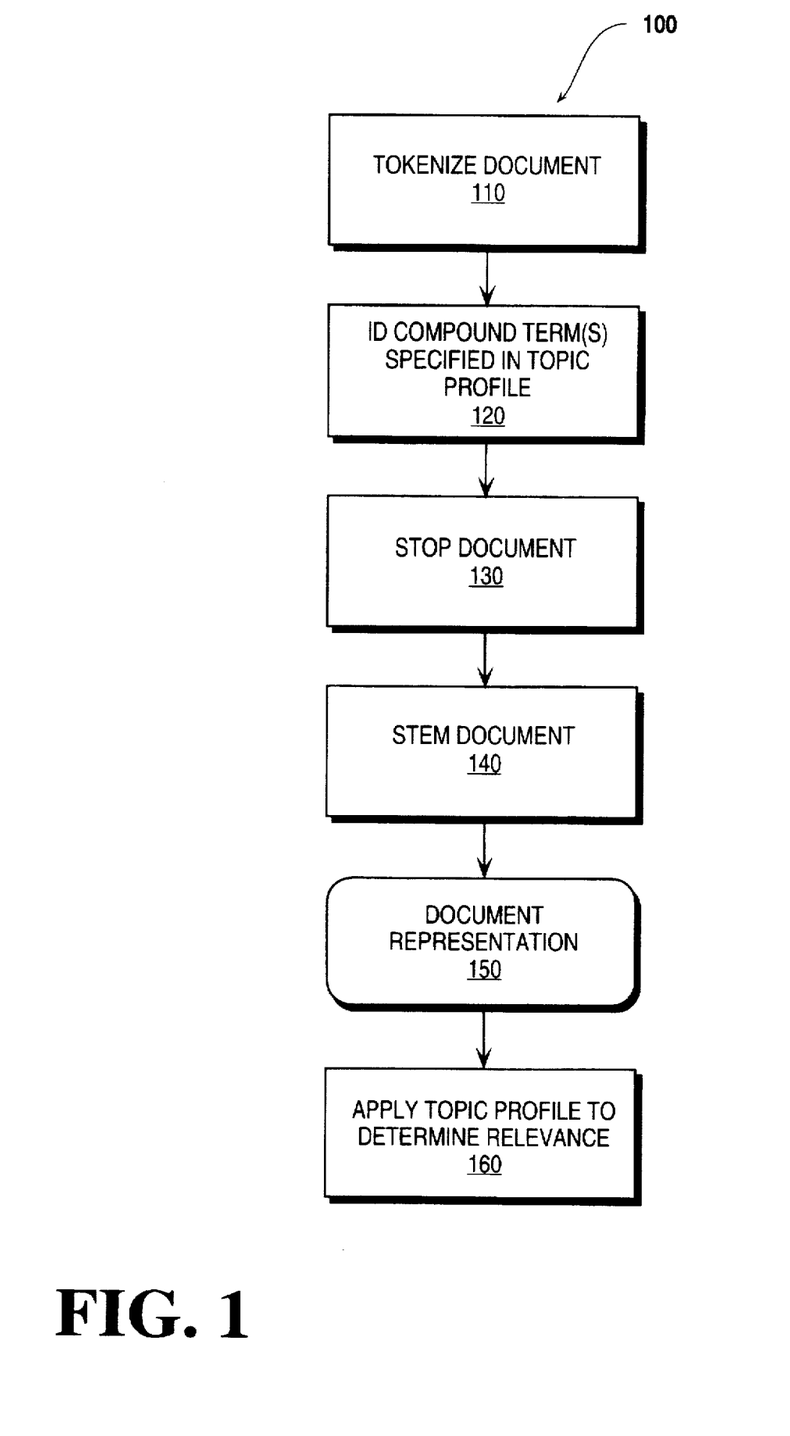
FIG. 1 is a flow chart of a method in accordance with the present invention for generating a document representation using a topic profile in accordance with the present invention.

Referring to FIG. 1, there is shown a preferred method 100 for generating a document representation in accordance with the present invention. Method 100 tokenizes 110 the document into a stream of document terms. In this discussion, tokenization 110 refers to conversion of a document to a stream of terms or tokens representing the words, punctuation marks, symbols, etc. of a document.

Compound terms specified in the topic profile are identified 120, and the stream of document terms is modified accordingly. As discussed below, compound term templates associated with the topic profile, are used to identify compound terms in a document, and a tag specified in the template indicates how the token(s) associated with an identified compound term is to be treated in subsequent processing steps.

Following compound term recognition 120, reduction steps 130, 140 eliminate tokens from the augmented stream of documents. For example, common terms such as "the", "of", "about", etc., repeated instances of terms in the same document, and selected terms tagged during compound term identification step 120 are eliminated (stopped) 130 from the stream. Additional selected terms are truncated (stemmed) 140 to their root forms. This eliminates word endings such as "ing", "ation", and plurals and allows the different forms of a word to be identified by their common root.

The result of steps 110–140 is a compact document representation 150 that is augmented by tokens for compound terms and suitable for relevance analysis by the topic profile. Because recognition step 120 is applied prior to stopping step 130 and stemming step 140, details of document terms such as their capitalization, punctuation, number, and the like, may be preserved in the document representation, if these details are useful in characterizing the topic. Where compound terms include more than one component term, location information may be preserved as well. For example, a compound term "processor bus" picks out all instances in a document in which the component term "bus" is preceded by the component term "processor".

Figure 2:
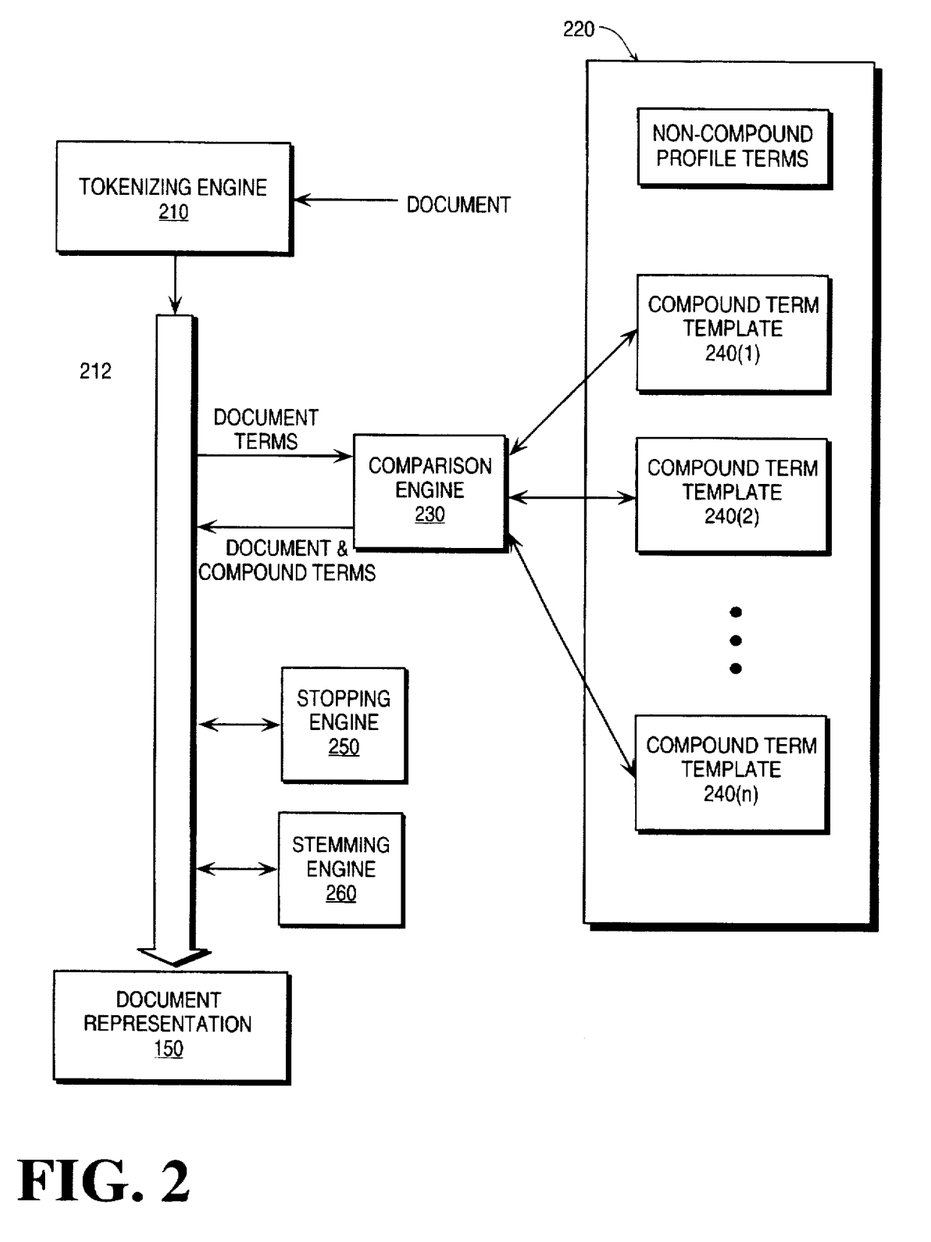
FIG. 2 is a block diagram of a system for generating a representation of a document, using a topic profile in accordance with the present invention.

Referring now to FIG. 2, there is shown a block level diagram of a system 200 for implementing method 100 in accordance with the present invention. System 200 comprises a tokenizing engine 210, a comparison engine 230, a topic profile 220 including one or more compound term templates 249(1), 240(2), 240(n), a stopping engine 250, and a stemming engine 260. In the following discussion, a general index j refers to a representative template (240(j)) of the collection of compound term templates 240(1), 240(2) . . . 240(n), and the collection of templates is identified without an index (240).

Tokenizing engine 210 converts the terms of a document into a stream 212 of document terms or tokens, which is acted upon by comparison engine 230, stopping engine 250, and stemming engine 260. Comparison engine 230 scans the document terms in stream 220 and a accesses compound term template 240(j) when an initial compound term of template 240(j) is identified in stream 230. In one embodiment, compound term templates 240 are represented by hash tables and comparison is effected by hashing terms in the document stream and comparing the terms with the label at the associated hash table entry.

If a comparison between stream 230 and template 240(j) indicates that a match exists, template 240(j) provides comparison engine 230 with a compound term token that has been tagged to indicate the retention/elimination status of the compound term and its component terms. The tagged token is added to stream 220, where it is acted upon by stopping engine 250 according to the status tag. Tokens that are not eliminated by stopping engine 250 are processed by stemming engine 260, where appropriate, and added to document representation 150. Representation 150 retains sufficient detail about the terms of the document to allow meaningful relevance analysis.

Figure 3:
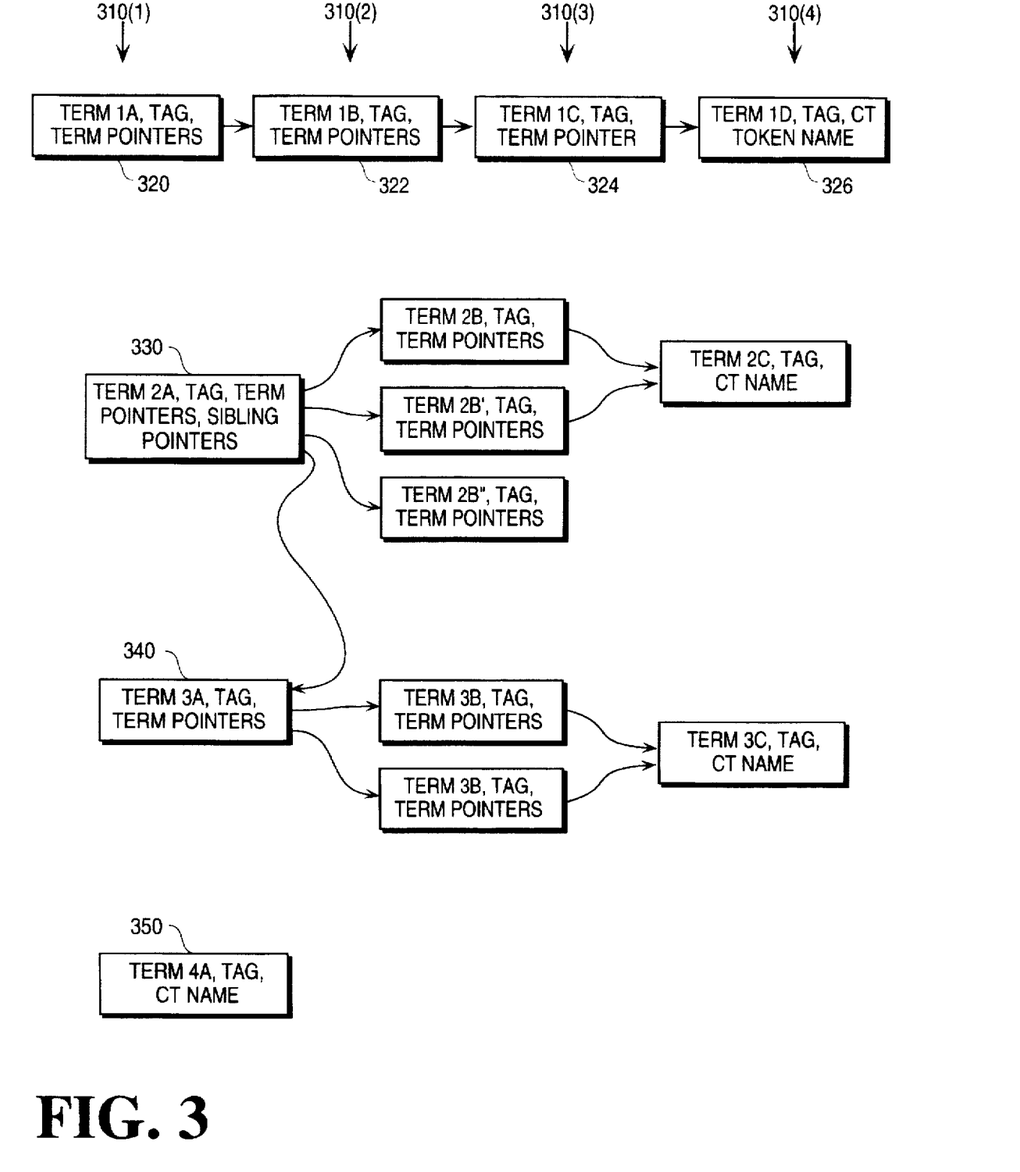
FIG. 3 is a schematic representation of one embodiment of the data structure used to identify compound terms specified in a topic profile, in accordance with the present invention.

Referring now to FIG. 3, there is shown one embodiment of compound term templates 240(1), 240(2), 240(3), 240(4) for specifying compound terms in topic profile 220. In the embodiment of FIG. 3A, compound term templates 240 are implemented as a series of hash tables 310(1), 310(2), 310(3) . . . 310(p). All entries in hash table 310(1) correspond to initial terms of one of the compound terms represented by compound term templates 240. Similarly, all entries of hash table 310(2) correspond to second component terms of one of the compound terms represented by templates 240.

Referring first to entry 320, term 1A is a label, e.g. character string, corresponding to the initial term of a compound term represented by compound term template 240(1). A tag in entry 320 specifies how term 1A is to be treated in a subsequent stopping step 140 (FIG. 1), and a pointer indicates the location in hash table 310(2) of the entry (1B) that follows term 1A in the compound term. Entries 322, 324 for terms 1B and 1C include similar information. Entry 326, which corresponds to the last component term in compound term template 240(1) includes a label for the term, a tag, and a label indicating the canonical name of the compound term, i.e. the token name.

Intermediate terms may also include a canonical name for the compound term, where a subset of the component terms may indicate the same compound term as the full set of component terms. For example, consider the case where compound term template 240(1) is designed to pick out references to the "Federal Bureau of Investigation" in a document. In this example, terms 1A, 1B, 1C, and 1D correspond to "Federal", "Bureau", "of", and "Investigation", respectively. A document might initially use the full name of the organization and subsequently identify it as the "Federal Bureau". In these latter instances of the term, template 240(1) terminates at term 1B and generates the same canonical compound term name as when the stream of document terms includes the full title. In general, any term of a compound term template 240(j) which may terminate an alternative representation of the compound term includes the canonical compound term name in addition to a pointer to the subsequent terms of the full compound term name.

The comparison between the term stream and template continues as long as document terms in the stream match the corresponding labels in an accessed compound term template. The comparison ceases when a document term from the stream fails to match the next term in the compound term template or a last term in the template is reached. In the first case, the template is closed, and in the second case, a compound term token is added to the document stream with a tag specified by the corresponding template.

Referring still to FIG. 3, entries 330 and 340 represent the initial terms for a compound term template 240(2) that includes an alternative form (template 240(3)) of the compound term. In this case, entry 330 includes pointers to more than one second term (terms 2B and 2B') in the compound term, as well as a pointer to a sibling first term (term 3A) having its own second terms 3B, 3B' and third term 3C. One use for such coupled templates arises where different capitalizations of a compound term are considered acceptable for identification purposes. For example, the compound terms, "savings and loan", "Savings and Loan", "Savings And Loan", "Savings & Loan", and "savings & loan" may be used in different documents relating to the banking industry. By assigning labels to the component terms of templates 240(2), 240(3) as indicated in Table 1 and coupling them as indicated by the arrows in FIG. 3A, the following variations on Savings and Loan will be identified in a document set: "Savings and Loan; Savings And Loan; Savings & Loan, Savings and loan; Savings & loan; savings and loan; and savings & loan. As noted above, where alternative forms are used for a compound term, the canonical name of the compound term token is preferably the same for each form. Thus, CT NAME is the same for both terms 2C and 3C.

TABLE 1

| Entry | 2A | 2B | 2B' | 2B" | 2C | 3A | 3B | 3B' | 3C |
|---|---|---|---|---|---|---|---|---|---|
| Term | Savings | And | & | and | Loan | savings | & | and | loan |

Entry 350 is the initial term of a compound term template 240(4) representing a compound term that has only a single component term. Consequently, entry 350 includes a label (term 4A), a tag, and a canonical name, but does not include pointers to other terms. Such compound term templates are useful for specifying a term for which a specific capitalization is sought. For example, a search term "thrift" may pick up documents relating to a wide variety of topics. By specifying it as a compound term and including a template for only the capitalized form of the word, searchers can identify only those documents that use the term to refer to financial institutions. Another single component compound term useful in the same search is "thrifts", where compounding is used to retain the plural form in the document representation. A two component compound term, "the thrift", would also be useful for these purposes. Because, for example, "thrift" and "S&L" are used interchangeably to describe certain financial institutions, they are identified by the same canonical name.

Where a compound term comprises a single term entry, i.e. the initial term, the comparison consists of matching the label of the initial term entry to the initial term used to access the compound term template. Where alternative form templates are associated with an initial term, the alternative form templates are accessed along with the compound term template, and comparison of stream terms with the component terms of the templates proceed in parallel.

As noted above, the externally defined topic profile both generates a document representation and determines the relevance of a document to a topic specified by the topic profile. The terms of the topic profile identify the vocabulary used to discuss the specified topic. The topic profile identifies and preserves these terms, where possible, in a document representation. Accordingly, terms selected for the topic profile are those having a strong, positive correlation with the specified topic and a weak positive correlation with topics that are unrelated to the specified topic. In practice, however, it is often difficult to identify terms that are both strongly and uniquely correlated with the specified topic.

One embodiment of the present invention employs a multiple weighting to fine tune the relevance analysis, where necessary to compensate for the potential ambiguities of terms selected for the topic profile. In particular, it allows a document to be analyzed against a threshold standard using a first set of weights (selection weights) for profile terms identified in the document. A document meeting the threshold criteria is deemed relevant to the specified topic. A second set of weights (production weights) may be employed for determining a measure of relevance for the document from the profile terms identified in the document. The production weights are adjusted to reflect, among other things, the greater likelihood that a profile term present in a document deemed relevant is being used to discuss the specified topic.

The tagging feature of topic profiles is employed to identify compound terms and to bypass or bias the similarity function/weighting scheme for selected profile. The use of tags to bias the weighting scheme may arise, for example, where a particular profile term is invariably used in discussions of the specified topic, e.g. a term having >95% correlation with the specified topic. In order to recognize the significance of this term in a document, without artificially depressing the weights used to determine threshold relevance from other profile terms, the profile term may be tagged so that documents including the term are analyzed in a non-standard manner. The use of tags in this manner is suggested only where circumstances indicate that the weighting scheme may fail to capture some relevant documents or may capture a large number of irrelevant documents.

Referring now to Table 2, there is shown a pseudo-code representation of a topic profile in accordance with the present invention. For completeness, the topic profile is represented with tags and multiple weights for profile terms.

TABLE 2

| | |
|---|---|
| <Topic Profile> := | <List of Topic Profile Elements> |
| <List of Topic Profile Elements> := | <Tagged Primary Item><List of Topic Profile Elements> |
| <Tagged Primary Item> := | <Tagged Compound Term><Tagged Simple Term> |
| <Tagged Compound Term> := | <Item Modifier><Compound Term> |
| <Tagged Simple Term> := | <Item Modifier><Token> |
| <Item Modifier> := | <Selection Wt.><Production Wt.><Item Tag List> |
| <Selection Wt> := | <Number><Null> |
| <Productiou Wt.> := | <Number><Null> |
| <Item Tag List> := | <Item Tag><Item Tag List><Item Tag> |
| <Compound Term> := | <List of Tokens> |
| <List of Tokens> := | <Token><List of Tokens><Token> |
| <Item Tag> := | <Item Tag><Null> |
| <Item Tag> := | ATOM |
| <Token> := | ATOM |
| <Number> := | ATOM |

As used in Table 2, a token is a word, number, or punctuation mark which follows the same rules used in tokenizing 110 (FIG. 1) a document into a stream of document terms. That is, if tokenization step 110 considers apostrophes and dashes as part of a single token, the topic profile represented by Table 2, will include apostrophes and dashes in the token. Alternatively, if tokenization step 110, considers apostrophes or dashes as token separators, the topic profile tokens will be defined similarly. In the preferred embodiment of the invention, documents are tokenized to preserve capitalization, number, and the like, at least through compound term recognition step 120. An ATOM represents a term, weight (selection or production), or tag in a topic profile.

A selection weight associated with a profile term provides an indication of how significant the presence of the profile term in the document is in an initial threshold analysis. In one embodiment of the invention, a similarity function between the topic profile and the document is calculated using the selection weights of profile terms identified in the document and compared against a relevance threshold value. This comparison serves as a binary filter for the document set. Assigning a large selection weight to a profile term indicates that the term has a significant positive correlation with the specified topic and does not have a significant positive correlation with other topics.

A production weight associated with the term provides an indication of how relevant the document is to the specified topic once it has been established that the document meets the relevance threshold. Differences between the selection and production weights may be used, for example, to reflect the greater likelihood that a term, which may alias other topics, is being employed in a discussion of the specified topic once the overall relevance of the document to the specified topic has been established. In sum, associating with each term a selection weight and a production weight that may be set independently, allows the presence of a profile term in a document to be de-emphasized, i.e. assigned a lower selection weight, when determining the threshold relevance of the document if the profile term correlates strongly with topics other than the specified topic, i.e. aliasing.

Once threshold relevance to the specified topic has been established for the document, use of a higher production weight reflects the increased likelihood that the term is being used to discuss the specified topic. A well-selected assignment of production weights to the terms of a topic profile provides measures of relevance for a document set that are spread over a range above the threshold level in a manner that roughly tracks the ordering an expert would assign to the relevant documents.

In the absence of any significant overlap between the vocabularies used to discuss the specified topic and those used to discuss other topics, the selection weights and production weights of the profile terms would be closely related if not identical. In fact, where selection weights are not given, a default assignment for the selection weight may be to set it equal to the production weight. More generally, however, associating with each term selection and production weights that are set independently, allows the topic profile to compensate for the aliasing potential of profile terms without ignoring the terms entirely.

In the present invention, overlap between a topic profile and document representation is determined by a similarity function. In one embodiment of the present invention, the similarity function is given by Equation (I):

$$SIM(DOC_i, PROFILE) = N \cdot \sum_{k=1}^{n} DTERM_{ik} \cdot PTERM_k$$

Here, $DTERM_{ik}$ indicates whether the $k^{th}$ term of the topic profile is present in the $i^{th}$ document of the document set ($Doc_i$). $PTERM_k$ is a weight associated with the $k^{th}$ term of the topic profile. Profile is a collection of PTERMs specified in the topic profile, and N is a normalization constant. As noted above, $\{PTERM_k\}$ may be unity, a weight, or a set of weights for each profile term, depending on the analysis scheme chosen. $DTERM_{ik}$ is 1 or zero, depending on whether profile term k is present in $Doc_i$. The set $\{DTERM_{ik}\}$ may be derived from the document representation by identifying which terms of the topic profile are present in the document representation. Other functions providing comparable measures of overlap between the document representation and topic profile may be used in place of Equation (I).

As noted above, tagging allows profile terms in a topic profile to be treated in a non-standard manner. In particular, tagging profile terms provides a way to force the relevance threshold determination to a specified outcome, independent of the selection weights of profile terms identified in the document. In effect, tagging may be used to replace the selection weights of a topic profile with a single, binary weight (0/1) determined by the presence or absence of a tagged profile term. In this case, Equation (I) is not used for determining a document's relevance threshold. However, where a multiple weighting scheme is employed, Equation (I) will be used in a second calculation based on production weights.

As noted above, tagging may be appropriate for a profile term that consistently appears in any discussion of the specified topic and, consequently, has a high, positive correlation with the specified topic, e.g. greater than 95%. In this case, the profile term may be tagged to indicate that its presence in a document is "required" in order for the document to satisfy the relevance threshold criteria. Where a topic profile includes a profile term tagged "required", no document will be deemed relevant to the selected topic unless it includes the "required" term. On the other hand, unless the "required" term is uniquely correlated with the specified topic, characterizing a document as relevant, based solely on the presence of the "required" term, ignores the relevance-discriminating power of other profile terms and is likely to lead to inclusion of non-relevant documents.

Accordingly, the presence of a "required" term in a document is best regarded as a necessary but not sufficient condition for the document to be deemed relevant.

In some instances where tagging is employed, it may be that the presence in a document of any one of a number of alternative terms satisfies the "required" condition. Accordingly, each term may be tagged "required", and detection of any one of the "required" terms would suffice to meet the required-term threshold. If none of the "required" terms is present, the document will be deemed not relevant, even where the selection weights of profile terms present in the document would yield a value in excess of the relevance threshold value.

Another potentially useful category of tagged terms are those terms whose presence in a document substantially guarantee the specified topic is discussed, i.e. the presence of the term is a "giveaway" that the document is relevant. "Giveaway" terms are those terms that discriminate strongly against all but the specified topic and are strongly correlated with the specified topic. The presence of a giveaway term in the document is taken as such a strong indicator that the specified topic is being discussed, the relevance threshold determination is by-passed. In this case, the presence of a giveaway term is regarded as a sufficient but not necessary condition for the document's being relevant to the specified topic. Tagging a term as "giveaway" is equivalent to assigning a very large selection weight to the term in the topic profile. However, using the "giveaway" tag instead of a large selection weight, preserves the relevance-discriminating value of the selection weights of other profile terms in those documents where the "giveaway" term is not present.

Other tags are used to determine how compound terms are treated, when they are identified in the document. For example, where a profile term is a compound term comprising multiple-component terms, tags specified in the data structure and associated with the token(s) introduced into the document stream indicate whether the tokens for the component terms are to be retained in the term representation. For example, component terms that alias topics other than the one represented by the topic profile are tagged for elimination at stopping step 130.

Referring now to Table 3, there is shown an example of a topic profile useful for identifying documents relevant to the banking industry.

TABLE 3

| Profile Terms | Canonical Name (Token) | Weight | Tag |
|---|---|---|---|
| mortgage | mortgage | 0/60 | |
| "Bank" | Bank | 180 | — |
| "s & l" | | | — |
| "savings & loan" | | | |
| "Savings & Loan" | | | |
| "savings and loan" | | | |
| "Savings and Loan" | s & l | 150 | |
| "Thrift" | | | |
| "the thrift" | | | |
| "thrifts" | | | |
| "credit union" | credit union | 80 | — |
| "West Bank" | West Bank | 0/0 | % |
| "Left Bank" | Left Bank | 0/0 | % |

In table 3, compound terms are identified, i.e. tagged, with quotation marks. These are the selected profile terms that will be used to identify and tag tokenized document terms for the document representation when they appear in the specified form. For example, only the term "Bank", with a capital "B" will be retained in a document representation, since "bank" appears in many contexts unrelated to the financial industry. To distinguish documents that include references to "Left Bank" and "West Bank", these compound terms are tagged with %. This tag indicates that the instances of the terms "Left", "West", and "Bank", are not to be retained in the document representation when they are identified in the document within the compound term. The compound terms "West Bank" and "Left Bank" are retained but are assigned 0 selection and production weights.

In this example, tagging avoids aliasing, whereby a term (Bank) correlated with the topic may also correlates with a different topic in a different context. "West Bank" and "Left Bank" are relevant to discussions of the Mid-East and Paris, respectively, despite their inclusion of the compound term "Bank". Since neither topic is relevant to Financial Institutions, the tags provide a convenient way to eliminate them from consideration The terms "Thrift", "thrifts", and "the thrift" are compound terms because they specify capitalization, number (plural), and multiple terms, respectively. The specific features of these terms are specified to distinguish them from the common term, thrift, which may appear in many different contexts. Indexed-based representations typically eliminate capitalization and number information in the indexing process. Consequently, they require substantially more data, i.e. location information for all index terms, to recognize multiple component terms and to distinguish alias terms.

The various forms of "savings and loan" are also compound terms because they include multiple terms and/or specific capitalizations. As indicated in the Table 3, the forms of "thrift" and "savings and loan" are all represented by the same token, s&l, in the document representation, and given the same weight in the topic profile. This strategy reflects the fact that these compound terms refer to the same type of entity, i.e. a savings and loan institution, and avoids overweighting the relevance of documents that use multiple terms to reference the same entity.

Referring still to Table 3, the profile term, mortgage, is assigned different selection (0) and production(60) weights. This reflects the fact that "mortgage" appears in different contexts, e.g. real estate, and so should not be weighted heavily in determining threshold relevance. Once a document is deemed relevant, however, the presence of the term mortgage in the document is accorded weight in calculating the similarity function and, thus, the measure relevance of the document to financial institutions.

Where terms are assigned only a single weight, the production and selection weights are the same. If only single weights are assigned to all terms in the topic profile, a separate calculation of the threshold relevance is unnecessary. Also, if no weights are assigned, a default value, i.e. 100, may be assumed for calculating similarity functions. In each case, the normalization factor N of Equation (I) should be adjusted to reflect the different weighting scheme.

It is useful to define different categories for characterizing terms considered for inclusion in a topic profile. In the following discussion, "common" terms are those terms that arise frequently in the discussion of many different topics and consequently lack any power to discriminate between different topics. Common terms, such as articles, pronouns, and prepositions, correspond to those terms eliminated from document indices by stopping (step 130 in FIG. 1). In addition to these terms, common terms, as used in reference to topic profiles, may include words like "ground", "statement", "authorize", "task", which alias many different topics.

Unambiguous terms refers to those terms that are strongly correlated with the specified topic and which are not strongly correlated with any other topics. These terms, while rare, are ideal candidates for inclusion in a topic profile that characterizes the specified topic.

As noted above, "alias terms" refers to those terms that are correlated with the specified topic, but which may be correlated with other topics in different contexts. For example, the term "French" is not a common term, and it has a strong, positive correlation with the topic of French culture. However, this term may also appear in documents relating to music (French horn), breakfast foods (French toast), and fast foods (French fries). Aliasing refers to situations in which a profile term that is strongly correlated with a specified topic may also appear in a different context with a meaning different from that in the specified topic. Alias terms are those terms having the context-dependent meaning.

Ambiguities introduced by aliasing may often be removed by defining compound terms which clarify the context in which the term is being used. For example, the terms, "French toast", "French horn", and "French fries", may be identified in a document as compound terms and tagged to indicate their treatment in analyses for the specified topic. In the above, example, any incidence of "French" appearing in the compound terms may be ignored, i.e. compound terms assigned 0 weight and tagged with %, when determining the relevance of a document to French culture.

Characterization of terms as common, unambiguous, or alias is neither exact nor absolute. Terms considered for a topic profile will fall along a continuum ranging from those that correlate strongly and exclusively with the specified topic, i.e. unambiguous terms, to those that apply to just about any topic, i.e. common terms. It is expected that profile terms and their associated weights will be determined in part by trial and error.

Figure 4:
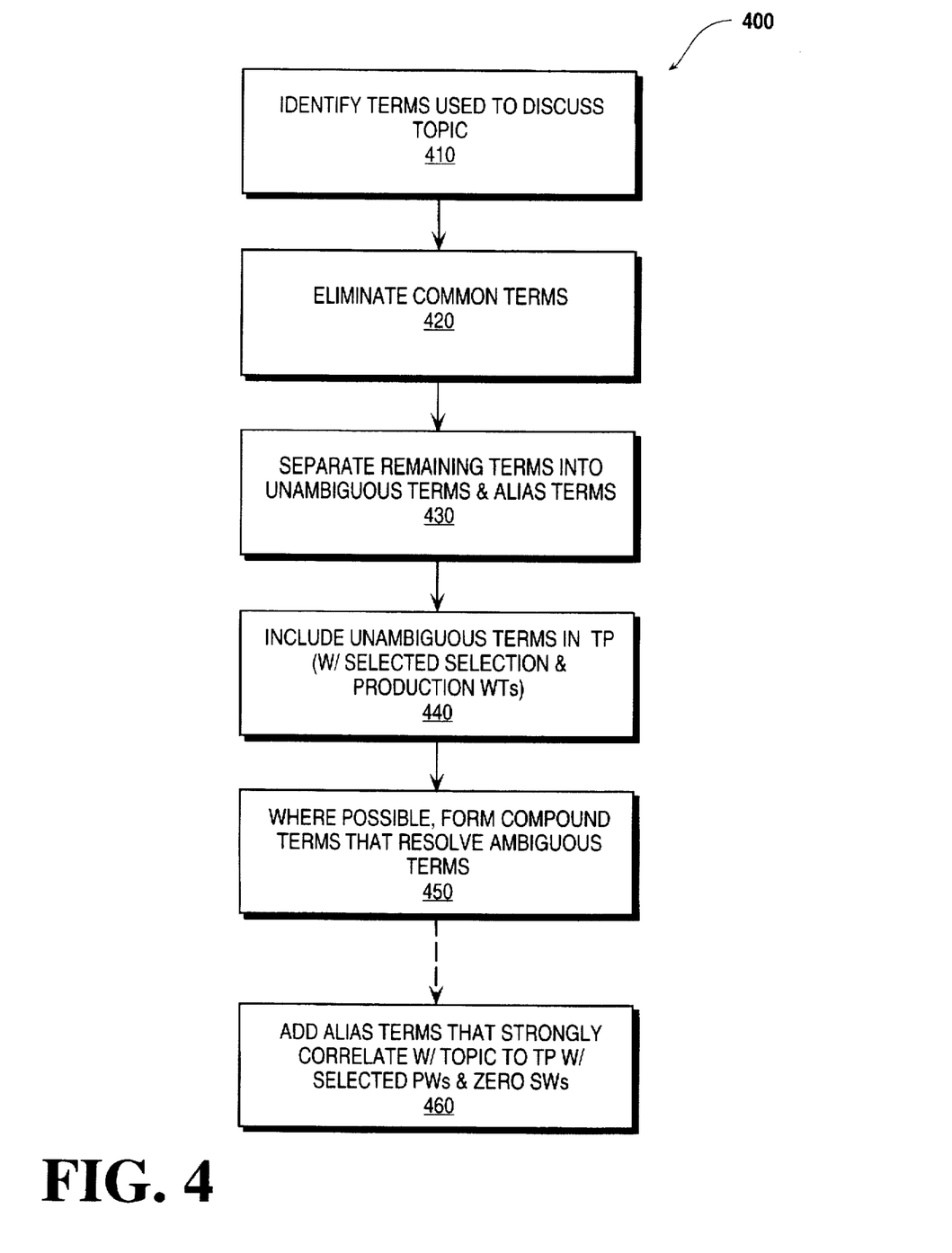
FIG. 4 is flowchart of a method in accordance with the present invention for generating a topic profile.

Referring now to FIG. 4, there is shown a flowchart of a method 400 for generating a topic profile in accordance with the present invention. Initially, method 400 identifies 410 terms used to discuss the specified topic and eliminates 420 common terms from among the identified terms. The remaining terms are separated 430 into unambiguous terms and alias terms. Unambiguous terms are included 440 in the topic profile and, if weights are being used, appropriate selection and production weights are assigned.

The remaining alias terms are treated according to how strongly they may be made to correlate with the specified topic. Selected alias terms may be used to greater effect by forming compound terms 450 that resolve the contextual ambiguity. This is the case in the use of variations on "thrift" described above.

Alias terms that can not be resolved by compounding but are strongly correlated with the specified topic may also be included 460 in the topic profile. If no weighting scheme is used or only a single weight is associated with each term, inclusion of alias terms is likely to turn up some irrelevant documents. In the dual weighting scheme, however, the selection weight of such an aliased term may be set to zero or a very low value, while the production weight is assigned a non-zero value representative of the correlation between the term and the specified topic. This strategy allows the presence of the term in a document to be considered in determining the relevance measure of the document, provided the document is deemed to meet the threshold relevance value based on the presence of other (non-aliased) terms in the document. Alias terms that are only weakly correlated with the specified topic are not included in the topic profile.

This embodiment of method 400 ensures that a document including terms that alias a different topic is not discarded at the relevance threshold stage, provided it also contains unambiguous terms. Assignment of a non-zero production weight to the alias term allows it to be considered in relevance determinations of those documents that meet the relevance threshold based on the presence of other terms.

Figure 5A:
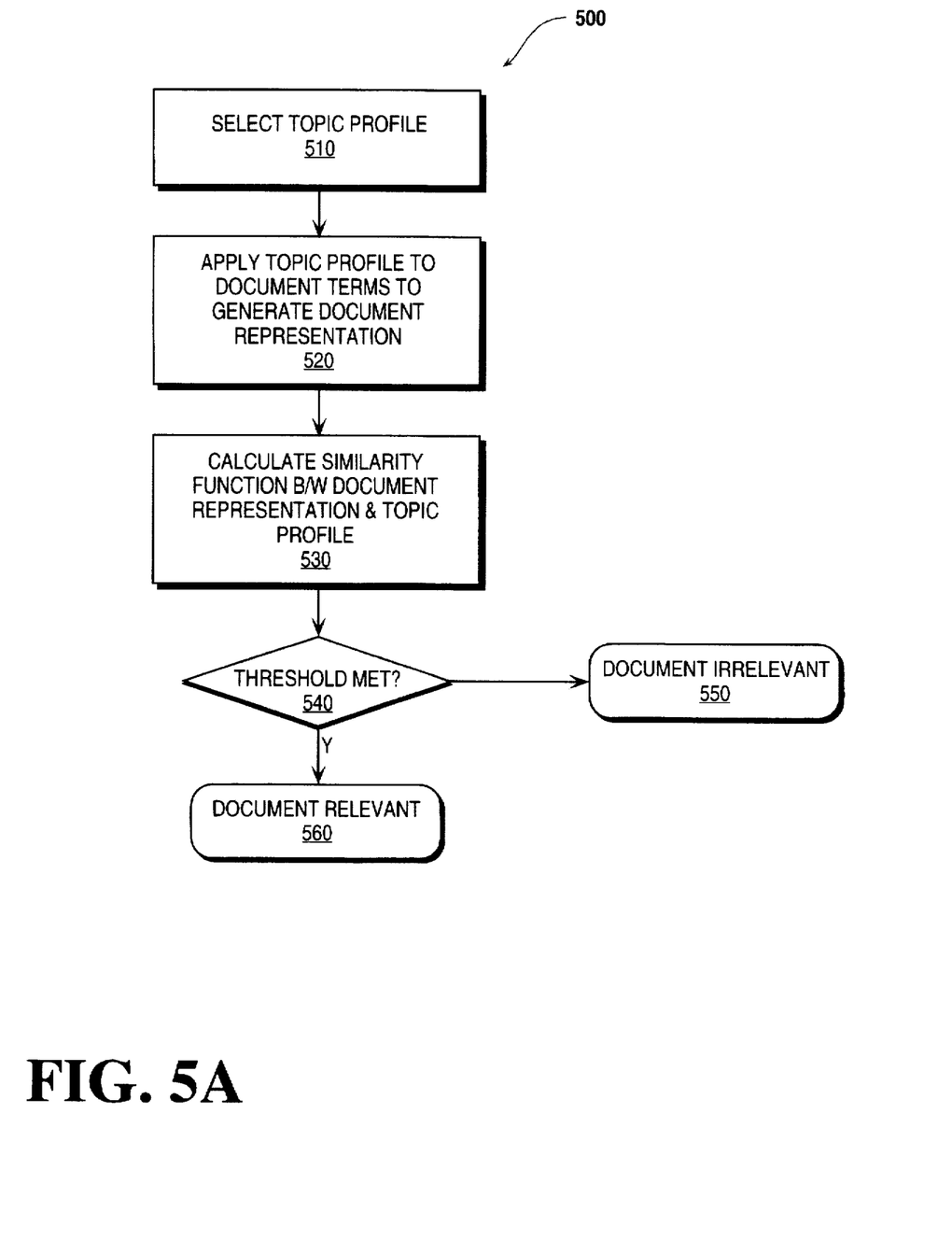
FIG. 5A–5C are flowcharts of various embodiments of a method in accordance with the present invention for determining the relevance of a document to a subject area specified through one or more topic profiles.

Referring now to FIG. 5A, there is shown an overview of a method 500 for determining a measure of relevance of a document to a specified topic, in accordance with the present invention. A topic profile for the subject of interest is selected 510 to analyze the document. The selected topic profile may be generated specifically for the analysis, or a previously generated topic profile may be retrieved for the analysis.

The topic profile is applied 520 to the document to generate a document representation augmented to include tokens for any compound terms specified in the topic profile. As noted above, this occurs prior to the conventional stopping and stemming steps (steps 130 and 140 in FIG. 1), to preserve details of the original document text that are otherwise eliminated by these steps.

A similarity function between the document representation and the topic profile is then calculated 530 to determine a measure of the corresponding document's relevance to the topic. The similarity function is calculated using any profile terms, whether single or compound, present in the document representation and with the weighting scheme indicated in the topic profile. For example, using the similarity function represented by Equation I, only those document terms (DTERMs) that are also profile terms (PTERMs) are counted. Where no weighting scheme is employed, $PTERM_k=1$ for all k, i.e. all profile terms identified in a document representation are given equal weighting. In effect, Equation (I) increments a sum by $PTERM_k$ for each profile term (k) present in the document representation and scales the sum by a normalization factor. The value generated by the similarity function, Equation (I), is compared 540 to a threshold specified for the topic profile. The document is deemed 550 irrelevant (!relevant) when the threshold level is not met and it is deemed 560 relevant when the threshold level is met or exceeded.

Figure 5B:
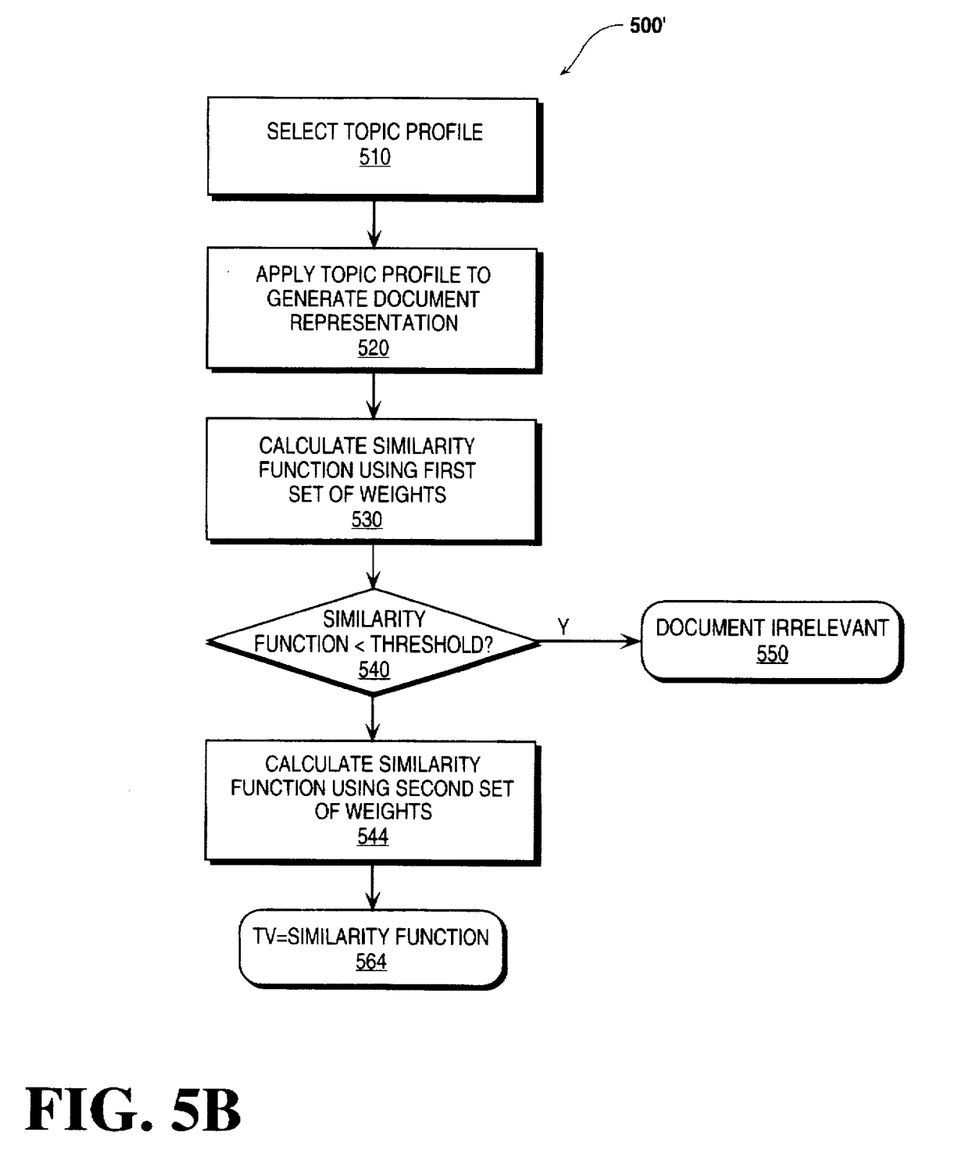

Referring now to FIG. 5B, there is shown an embodiment of method 500 (method 500') in which a threshold relevance and a comparative relevance are calculated 530, 544 using selection and production weights, respectively, associated with profile terms identified in the document. In particular, the selection weights of the identified terms are used to calculate 530 a similarity function between the identified terms and the topic profile. If the calculated similarity function exceeds 560 a threshold value, the document is deemed relevant to the topic represented by the topic profile, and a similarity function between the identified terms and the topic profile is calculated 580 using the production weights of the profile terms identified terms identified in the representation. A topic value (TV) is then assigned 590 the value of this similarity function.

Figure 5C:
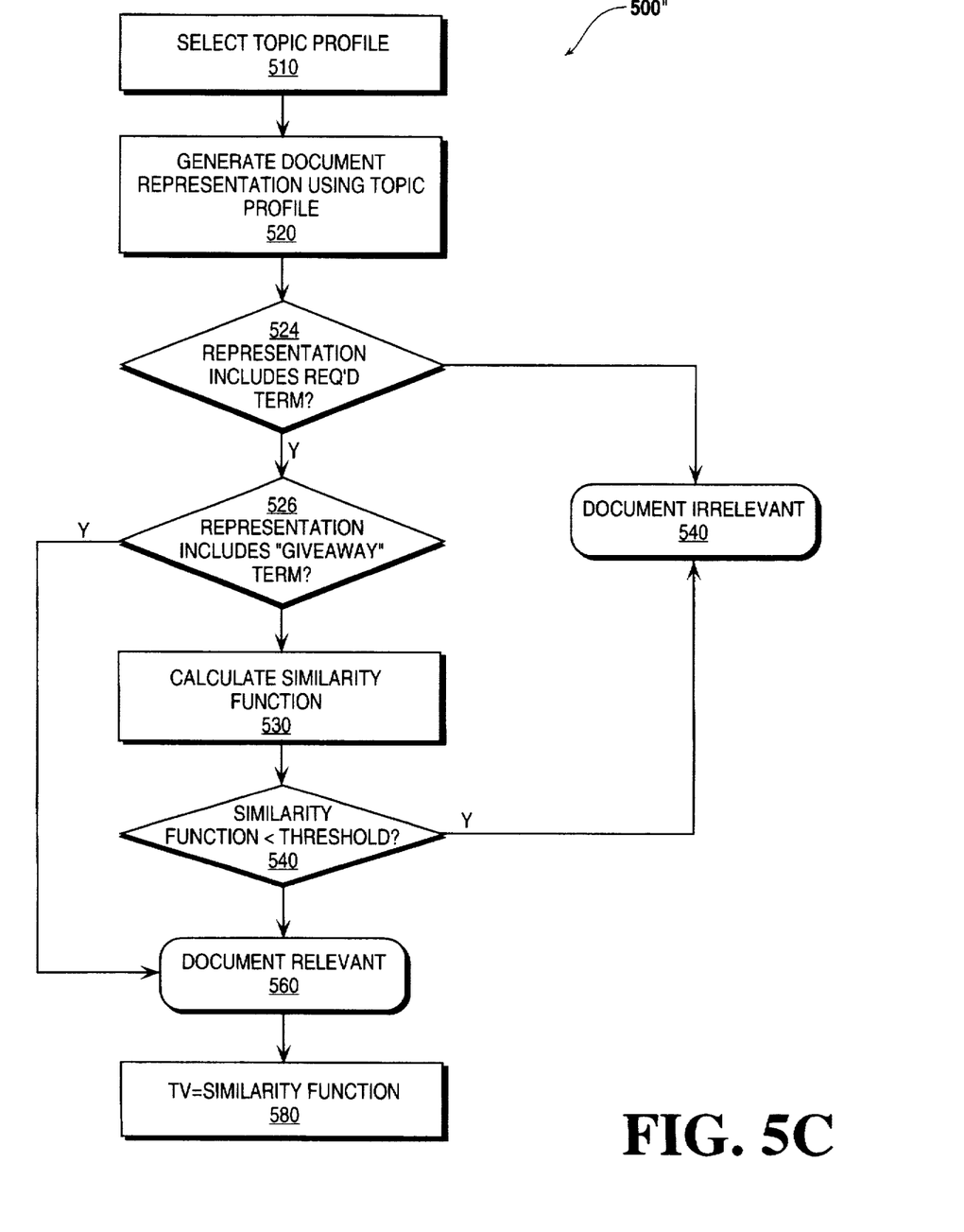

Referring now to Fig. 5C, there is shown a another embodiment of method 500 (method 500") in which selected profile terms are tagged to bypass or modify calculation of a similarity function for threshold determination. In method 500", threshold relevance may be determined 530 in one of several ways. For illustration, consider the case where a topic profile includes profile terms tagged "required" and "giveaway". If the representation does not include 524 the "required" profile term, the document is deemed 540 not relevant, independent of the correlation between the document representation and the other terms of the topic profile. If the representation includes 524 the "required" profile term, the analysis proceeds. If the topic profile includes 526 the profile terms tagged "giveaway", the document is deemed relevant 560, and a topic value is calculated 580 using the weights of profile terms present in the document representation. If a multiple weighting scheme is employed, this calculation is done using the production weights.

If the "giveaway" profile term is not present 526 in the document representation, the document must be subjected to a threshold determination of relevance. Accordingly, a similarity function is calculated 530 between the document representation and topic profile and compared 540 with the relevance threshold. The document is deemed relevant 560 if the similarity function meets or exceeds the threshold. The value calculated for the similarity function is the topic value 580, unless a multiple weighting scheme is used. In the latter case, a second similarity function is calculated using the production weights and the value of this similarity function serves as the topic value.

There has thus been provided a method for determining a thresholded measure of relevance of a document to a topic specified by a topic profile. The topic profile comprises one or more compound terms, the forms of which are specified with sufficient detail to emphasize their correlation with the topic while minimizing their correlations with other topics. The document representation is generated with reference to the topic profile to ensure that any compound terms present in the document are retained in document representation in the form specified in the topic profile. The resulting document representation is thus tailored to the topic being searched, and the document's relevance to the topic is determined by calculating a similarity function between the document representation and the topic profile.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for determining a thresholded measure of relevance of a document to a topic defined by a topic profile that includes a compound term template, the method comprising the steps of:

converting the document into a stream of tokens;

scanning the stream for one or more tokens matching the compound term template;

augmenting the document tokens with a compound term token to provide a representation of the document, when a match is detected; and calculating a similarity transform between the document tokens and the topic profile to provide the measure of relevance.

2. The method of claim 1, including the additional step of eliminating selected tokeins from the document representation, following the augmenting step.

3. The method of claim 2, wherein the eliminating step comprises the substeps of:

stopping selected tokens in the document representation; and stemming selected tokens in the document representation.

4. The method of claim 1, wherein the calculating step comprises the substeps of:

determining whether the document representation includes a by-pass profile term, when a by-pass profile term is specified in the topic profile;

determining a threshold relevance according to a tag associated with the by-pass profile term, when the 5. A method for identifying a topic to be searched in a document that is to be represented as a plurality of tokens, the method comprising the steps of:

identifying one or more profile terms having a positive correlation with the topic;

selecting from the one or more profile terms a compound term to be identified in a specified form in the document; and tagging the compound term to indicate a retention status for a token assigned to the compound term in the document representation when an instance of the compound term is identified in the document.

6. The method of claim 5, wherein the selecting step comprises selecting as the specified form a specified capitalization of the profile term.

7. The method of claim 5, wherein the selecting step comprises selecting as the specified form a specified punctuation for the profile term.

8. The method of claim 5, wherein the selecting step comprises selecting as the specified form a specified plural/singular form for the profile term.

9. The method of claim 5, wherein the selecting step comprises selecting as the specified form a specified location configuration for two or more profile terms.

10. The method of claim 9, wherein the tagging step comprises tagging the compound term to indicate that tokens for the two or more profile terms and the token assigned to the compound term be retained in the representation of the document.

11. The method of claim 9, wherein the tagging step comprises tagging the compound term to indicate that tokens for the two or more profile terms be excluded from the representation of the document.

12. The method of claim 5, comprising the additional steps of:

filtering the plurality of tokens representing the document in accordance with the retention status indicated for the tagged compound terms;

stopping and stemming the filtered plurality of tokens to generate a document representation for the document set; and calculating a similarity function between the document representation and the profile terms.

13. The method of claim 5, comprising the additional step of assigning a set of weights to the one or more profile terms to indicate the relative significance of the profile terms to the identified topic.

14. The method of claim 13, wherein the step of assigning weights comprises the substeps of:

assigning a first weight to each of the one or more profile terms for calculating a threshold relevance for the document; and assigning a second weight to each of the one or more profile terms for calculating a comparative relevance for the document.

15. The method of claim 14, comprising the additional steps of:

filtering the plurality of tokens representing the document in accordance with the retention status indicated for the tagged compound terms;

stopping and stemming the filtered plurality of tokens to generate a document representation for the document set; and calculating a similarity function between the document representation and the profile terms using the first set of weights.

16. The method of claim 15, comprising the additional steps of:

deeming the document relevant to the topic when the calculated similarity function exceeds a threshold value associated with the topic profile; and calculating a similarity function between the document representation and the topic profile using the second set of weights when the document is deemed relevant to the topic.

17. The method of claim 5, comprising the additional step of tagging selected profile terms, including the selected compound term, to indicate that the selected term must be present in order to deem a document in the document set relevant to the topic.

18. The method of claim 5, comprising the additional step of tagging selected profile terms to indicate that presence of the selected profile term in the document is sufficient to deem the document relevant to the topic.

19. The method of claim 5, comprising the additional step of tagging selected profile term to indicate that the presence of the selected profile term in the document is required to deem the document relevant to the topic.

20. A method for generating a representation of a document as a plurality of tokens tailored for searches on a selected topic, the method comprising the steps of:

identifying one or more profile terms having positive correlations with the selected topic;

selecting a profile term to be identified in a specified form in the one or more documents; and tagging the selected profile term to indicate a retention status for an associated token in the representation of the one or more documents.

21. A method for determining a measure of relevance of a document, represented as a plurality of tokens, to a specified subject area, the method comprising the steps of:

identifying a plurality of topics within the specified subject area;

for each identified topic, selecting a topic profile that includes one or more compound terms that are characteristic of the topic, have a specified form to be identified in the plurality of tokens representing the document, and an associated retention status tag;

modifying the plurality of tokens representing the document according to associated retention status tags when instances of the one or more compound terms are identified in the plurality of tokens;

stopping and stemming the modified plurality of tokens to generate a document representation; and calculating a similarity measure between each of the plurality of topic profiles and the document representation.

22. The method of claim 21, comprising the additional steps of:

identifying a relevance threshold associated with each of the topic profiles;

comparing the calculated similarity measure for a topic profile to the associated relevance threshold; and adding an indication of not relevant to the measure of relevance for the topic profile when the calculated similarity measure is less than the associated relevance threshold.

23. The method of claim 22, comprising the additional step of adding the calculated similarity measure for a topic profile to the measure of relevance when the calculated similarity measure is at least as large as the associated relevance threshold.

24. The method of claim 21, wherein the step of calculating a similarity measure comprises the substeps of:

identifying each topic profile term present in the document representation; and adding a weight associated with each identified profile term to a sum that represents the similarity measure.

25. A topic profile for evaluating the relevance to a topic of a document that has been tokenized into a stream of terms, the topic profile comprising:

one or more profile terms that are characteristic of the topic;

one or more tags associated with selected profile terms to indicate retention/elimination of document terms represented by the selected profile terms in the stream; and a relevance threshold, wherein the topic profile is applied to tokenized terms of the document to preserve selected profile terms in a document representation and he one or more compound terms 26. A method for generating a topic profile to determine a measure of relevance of a document to a topic characterized by the topic profile, the method comprising the steps of:

identifying a term used to discuss the topic;

eliminating the identified term when it is a common term;

adding the term the topic profile when the term has a strong, positive correlation with the topic and does not alias other topics; and when a term aliases other topics, defining a specified form for the term that reduces aliasing and maintains a positive correlation with the topic, and adding the specified form to the topic profile as a compound term.

27. The method of claim 26, wherein the step of defining a specified form comprises specifying a capitalization for the term.

28. The method of claim 26, wherein the step of defining a specified form comprises specifying punctuation for the term.

29. The method of claim 26, wherein the step of defining a specified form comprises specifying a singular/plural form for the term.

30. The method of claim 27, wherein the step of defining a specified form comprises specifying a location configuration with one or more other terms.

* * * * *